(12) United States Patent
Sekizuka et al.

(10) Patent No.: US 6,650,981 B2
(45) Date of Patent: Nov. 18, 2003

(54) CONTROL SYSTEM AND METHOD FOR CONTROLLING VEHICLE-OCCUPANT PROTECTING APPARATUS

(75) Inventors: Makoto Sekizuka, Susono (JP); Shuichi Ishimoto, Toyota (JP); Koichi Fujita, Toyota (JP); Yoichi Kozuru, Toyota (JP); Masami Aga, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 36 days.

(21) Appl. No.: 10/022,617

(22) Filed: Dec. 20, 2001

(65) Prior Publication Data

US 2002/0087243 A1 Jul. 4, 2002

(30) Foreign Application Priority Data

Dec. 28, 2000 (JP) .......................... 2000-401608

(51) Int. Cl.$^7$ .......................... B60R 21/32; B60Q 1/00; G01D 1/60
(52) U.S. Cl. .......................... 701/45; 701/72; 280/728.1; 180/282
(58) Field of Search ............................... 701/45, 46, 38, 701/72, 71, 41; 280/728.1, 729, 735, 755; 180/282, 271, 276; 340/429, 440

(56) References Cited

U.S. PATENT DOCUMENTS

| | | | | |
|---|---|---|---|---|
| 5,899,949 A | * | 5/1999 | Kincaid | 701/45 |
| 6,104,284 A | | 8/2000 | Otsuka | 340/440 |
| 6,154,697 A | * | 11/2000 | Otsuka | 701/45 |
| 6,282,474 B1 | * | 8/2001 | Chou et al. | 701/45 |
| 6,305,709 B1 | * | 10/2001 | Okada | 280/735 |
| 6,386,581 B1 | * | 5/2002 | Ohno | 280/735 |
| 6,438,463 B1 | * | 8/2002 | Tobaru et al. | 701/1 |

FOREIGN PATENT DOCUMENTS

| | | |
|---|---|---|
| JP | A 10-297422 | 11/1998 |
| JP | A 11-227556 | 8/1999 |
| JP | A 2000-9599 | 1/2000 |
| JP | A 2000-503278 | 3/2000 |
| JP | A 2000-127891 | 5/2000 |
| JP | A 2000-510407 | 8/2000 |

* cited by examiner

Primary Examiner—Tan Q. Nguyen
(74) Attorney, Agent, or Firm—Oliff & Berridge, PLC

(57) ABSTRACT

Control systems and methods for controlling a vehicle-occupant protecting apparatus that includes two vehicle-occupant protecting devices which are disposed on respective right and left sides of an automotive vehicle, are operable to determine whether the vehicle has a rollover motion, on the basis of a physical quantity or quantities indicative of a running condition of the vehicle, and, upon determination that the vehicle has said rollover motion, to operate only the vehicle-occupant protecting device(s) located on a rolling side of the vehicle. When the detected rollover motion is expected to develop into a serious rollover motion, non-rolling-side vehicle-occupant protecting device(s) is located on a non-rolling side of the vehicle is operated. Thus, the control system and method permit adequate operations of the vehicle-occupant protecting devices depending upon the rollover state of the vehicle.

16 Claims, 16 Drawing Sheets

F I G. 9A 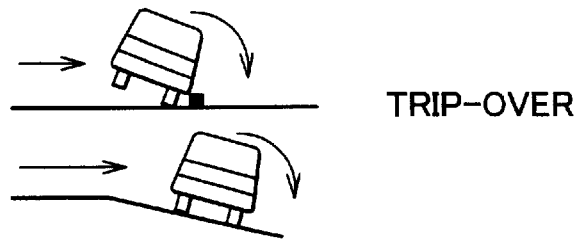 TRIP-OVER
F I G. 9B 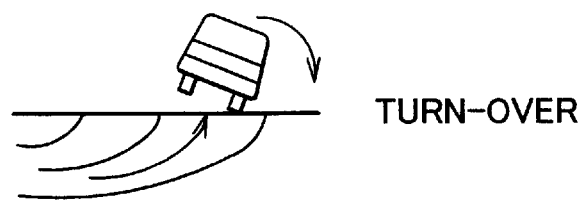 TURN-OVER
F I G. 9C 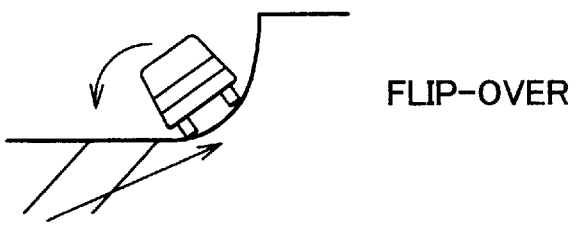 FLIP-OVER
F I G. 9D  BOUNCE-OVER
F I G. 9E 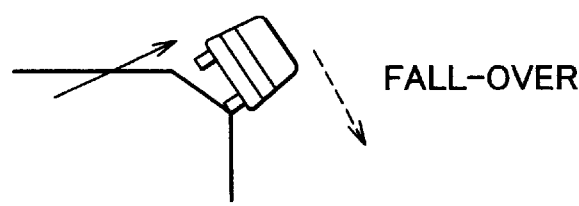 FALL-OVER

CONTROL SYSTEM AND METHOD FOR CONTROLLING VEHICLE-OCCUPANT PROTECTING APPARATUS

INCORPORATION BY REFERENCE

The disclosure of Japanese Patent Application No. 2000-401608 filed on Dec. 28, 2000, including the specification, drawings and abstract, is incorporated herein by reference in its entirety.

BACKGROUND OF THE INVENTION

1. Field of Invention

The present invention relates to a system and a method for controlling a vehicle-occupant protecting apparatus such that the vehicle-occupant protecting apparatus is operated upon detection of a rollover motion of an automotive vehicle.

2. Description of Related Art

It is known to provide a control system for controlling a vehicle-occupant protecting apparatus such that at least one airbag and/or at least one seat-belt pre-tensioner is/are operated upon collision of an automotive vehicle, to protect occupants of the vehicle. JP-A-2000-503278 discloses an example of such a control apparatus, which is arranged to selectively operate various airbags at suitable time intervals, depending upon the state of the vehicle collision.

However, the known technique described above suffers from a drawback that a rollover motion of the vehicle is not sufficiently taken into consideration.

SUMMARY OF THE INVENTION

It is one object of the present invention to provide a control system and a control method for a vehicle-occupant protecting apparatus, which permit the vehicle-occupant protecting apparatus to be operated adequately upon detection of a rollover motion of an automotive vehicle.

The above and/or other objects may be achieved according to one aspect of the present invention, which provides a control system for controlling a vehicle-occupant protecting apparatus including at least two vehicle-occupant protecting devices which are disposed on respective right and left sides of an automotive vehicle, including: a controller that (i) determines whether the vehicle has a rollover motion, on the basis of at least one physical quantity indicative of a running condition of the vehicle; and (ii) upon determining that the vehicle has the rollover motion, operates at least one of the vehicle-occupant protecting devices located on a rolling side of the vehicle.

In the present control system, the controller preferably further is operable after an operation of the above-indicated at least one rolling-side vehicle-occupant protecting device, to operate at least one of the non-rolling-side vehicle-occupant protecting devices. For example, the controller may, after determining that the vehicle has the rollover motion, determine whether the rollover motion of the vehicle is expected to develop into a serious rollover motion. In this case, the controller is adapted to operate the above-indicated at least one non-rolling-side vehicle-occupant protecting device after the rolling-side vehicle-occupant protecting device has been operated.

The above and/or other objects may also be achieved according to another aspect of the present invention, which provides a method of controlling a vehicle-occupant protecting apparatus including at least two vehicle-occupant protecting devices which are disposed on respective right and left sides of an automotive vehicle, including the steps of: detecting a lateral acceleration value of the vehicle; detecting a roll rate of the vehicle; calculating a roll angle of the vehicle; determining whether a running state of the vehicle represented by the roll angle and roll rate of the vehicle has fallen within a predetermined rollover region (A) defined by threshold lines representing a relationship between the roll angle and rate of the vehicle; determining whether a running state of the vehicle represented by the detected lateral acceleration value and roll rate of the vehicle has fallen within a predetermined rollover region (B) defined by threshold lines representing a relationship between the lateral acceleration value and roll rate of the vehicle; determining that a rollover motion of the vehicle has taken place, when the running state represented by the roll angle and rate has fallen within the predetermined rollover region (A) or when the running state by the detected lateral acceleration value and roll rate has fallen within the predetermined rollover region (B); and operating at least one of the vehicle-occupant protecting devices located on a rolling side of the vehicle.

The control system and method for controlling the vehicle-occupant protecting apparatus as described above are arranged such that upon determination that the vehicle has the rollover motion, only the rolling-side vehicle-occupant protecting device or devices located on the rolling side of the vehicle can be operated, while the non-rolling-side vehicle-occupant protecting device or devices located on the non-rolling side of the vehicle is/are not operated. Accordingly, the present arrangement prevents unnecessary operation of the non-rolling-side vehicle-occupant device or device, and consequently saves the repairing cost of the vehicle.

Further, the present arrangement permits operation of the non-rolling-side vehicle-occupant protecting device or devices at an adequate timing. In some cases, the present arrangement permits simultaneous operation of the rolling side and the non-rolling side vehicle-occupant protecting devices.

BRIEF DESCRIPTION OF THE DRAWINGS

The above and other objects, features, advantages, and technical and industrial significance of this invention will be better understood by reading the following detailed description of preferred embodiments of the invention, when considered in connection with the accompanying drawings, in which:

FIGS. 9A through 9E are illustrations of different types of the rollover motion of the vehicle;

DETAILED DESCRIPTION OF PREFERRED EMBODIMENTS

Referring to the accompanying drawings, there will be described preferred embodiments of a control system of the invention for controlling a vehicle-occupant protecting apparatus provided on an automotive vehicle. The control system for the vehicle-occupant protecting apparatus functions to control an airbag control device and a seat-belt pre-tensioner control device, and also functions as a vehicle rollover detecting device.

Figure 1:
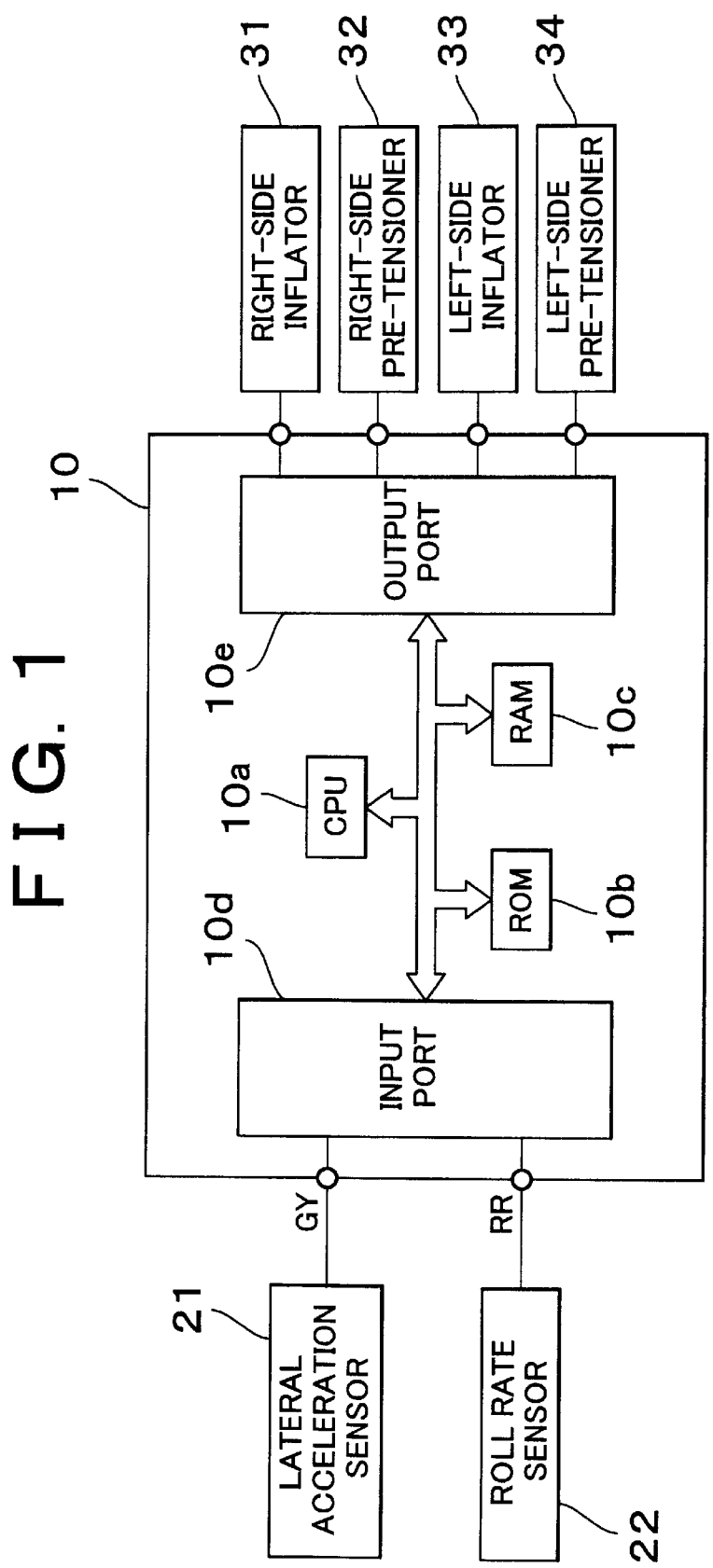
FIG. 1 is a schematic block diagram illustrating a control system arranged to control a vehicle-occupant protecting apparatus according to various embodiments of this invention.

Referring first to the block diagram of FIG. 1, there is schematically shown an arrangement of the control system connected to the vehicle-occupant protecting apparatus. This control system includes an electric control device 10 (or controller), which is constituted by a microcomputer incorporating a CPU 10a, a ROM 10b, a RAM 10c, an input port 10d and an output port 10e, etc., which are interconnected with each other through a bus. The CPU 10a is arranged to execute programs (described below) stored in the ROM 10b, while utilizing a temporary data storage function of the RAM 10c.

To the input port 10d of the electric control device 10, there are connected a lateral acceleration sensor 21 and a roll rate sensor 22, the output signals of which are received by the CPU 10a. To the output port 10e of the electric control device 10, there are connected a right-side inflator 31 disposed on the right side of the automotive vehicle, a right-side seat-belt pre-tensioner 32 disposed on the right side of the vehicle, a left-side inflator 33 disposed on the left side of the vehicle, and a left-side seat-belt pre-tensioner 34 disposed on the left side of the vehicle. The CPU 10a is adapted to apply drive signals to the inflators and pre-tensioners 31–34.

Figure 2:
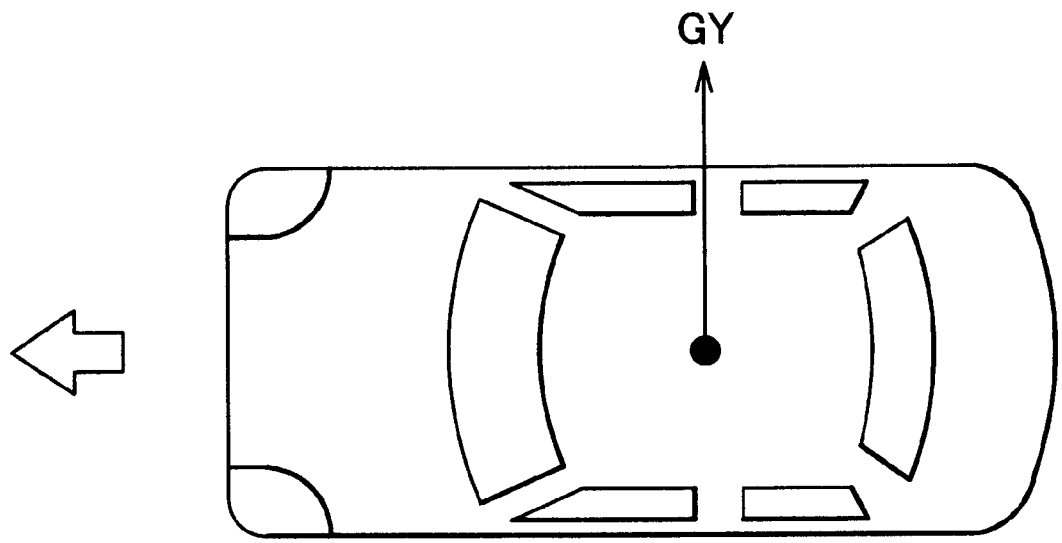
FIG. 2 is a plan view of an automotive vehicle, explaining lateral acceleration of the vehicle to be detected by a lateral acceleration sensor shown in FIG. 1.
Figure 3:
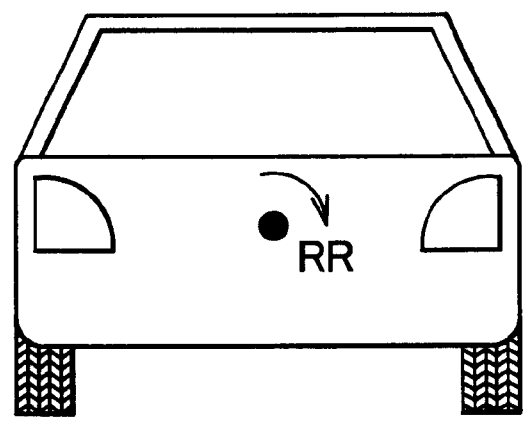
FIG. 3 is a front view of the vehicle, explaining a rollover motion of the vehicle to be detected by a roll rate sensor shown in FIG. 1.

The lateral acceleration sensor 21 is arranged to detect an acceleration GY of the vehicle (vehicle body) in its lateral or transverse direction, as indicated in FIG. 2. A positive value of the acceleration GY (hereinafter referred to as "lateral acceleration value GY") indicates the acceleration in the right direction (indicated by the arrow in FIG. 2). The roll rate sensor 22 is arranged to detect an angular velocity of rotation of the vehicle body about an axis (rolling axis) which passes through the center of gravity and extends in the longitudinal direction of the vehicle body, as indicated in FIG. 3. Namely, the roll rate sensor 22 is arranged to detect a roll rate RR of the vehicle. A positive value of the roll rate RR indicates the rate of rolling of the vehicle in the clockwise direction (indicated by the arrow in FIG. 3) as viewed from a position in front of the vehicle, that is, in the longitudinal direction from the vehicle front toward the rear. To eliminate noises and drifts from the output signals of the lateral acceleration sensor 21 and roll rate sensor 22, these sensors 21, 22 may be connected to the input port 10d of the electric control device 10 through known low-pass and high-pass filters.

Figure 4:
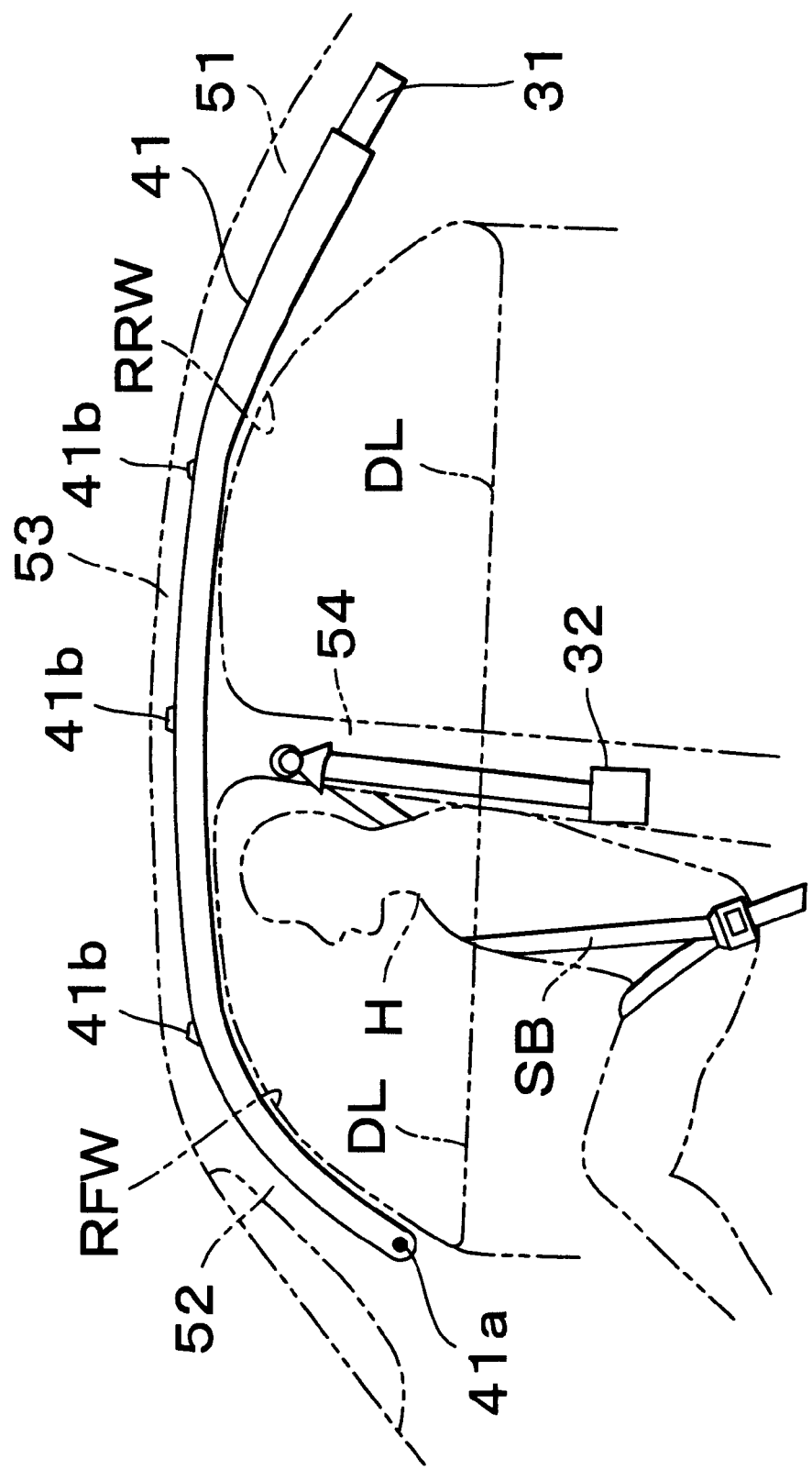
FIG. 4 is a fragmentary side view of the vehicle, showing an airbag to be inflated under the control of the control system shown in FIG. 1.

The right-side inflator 31 is attached to a quarter pillar 51, as shown in FIG. 4, and incorporates a squib which is activated by a drive signal (ignition signal) received from the electric control device 10 (shown in FIG. 1), to inject a gas into a right-side airbag (curtain shield airbag) 41 provided on the right side of the vehicle, for inflating the right-side airbag 41.

The right-side airbag 41 is attached, at a front fixing portion 41a located at its front end, to a front pillar 52 of the vehicle body, and at fixing portions 41b to a roof side rail 53 of the vehicle body. When the right-side airbag 41 is inflated, it is expanded until its lower end reaches a level close to a door-belt line DL, as indicated in FIG. 5, while maintaining a predetermined tension, such that the right-side airbag 41 covers substantially entire areas of a right-side front window RFW and a right-side rear window RRW, so that the body of a vehicle occupant H is prevented from moving in the laterally outward direction of the vehicle.

Figure 5:
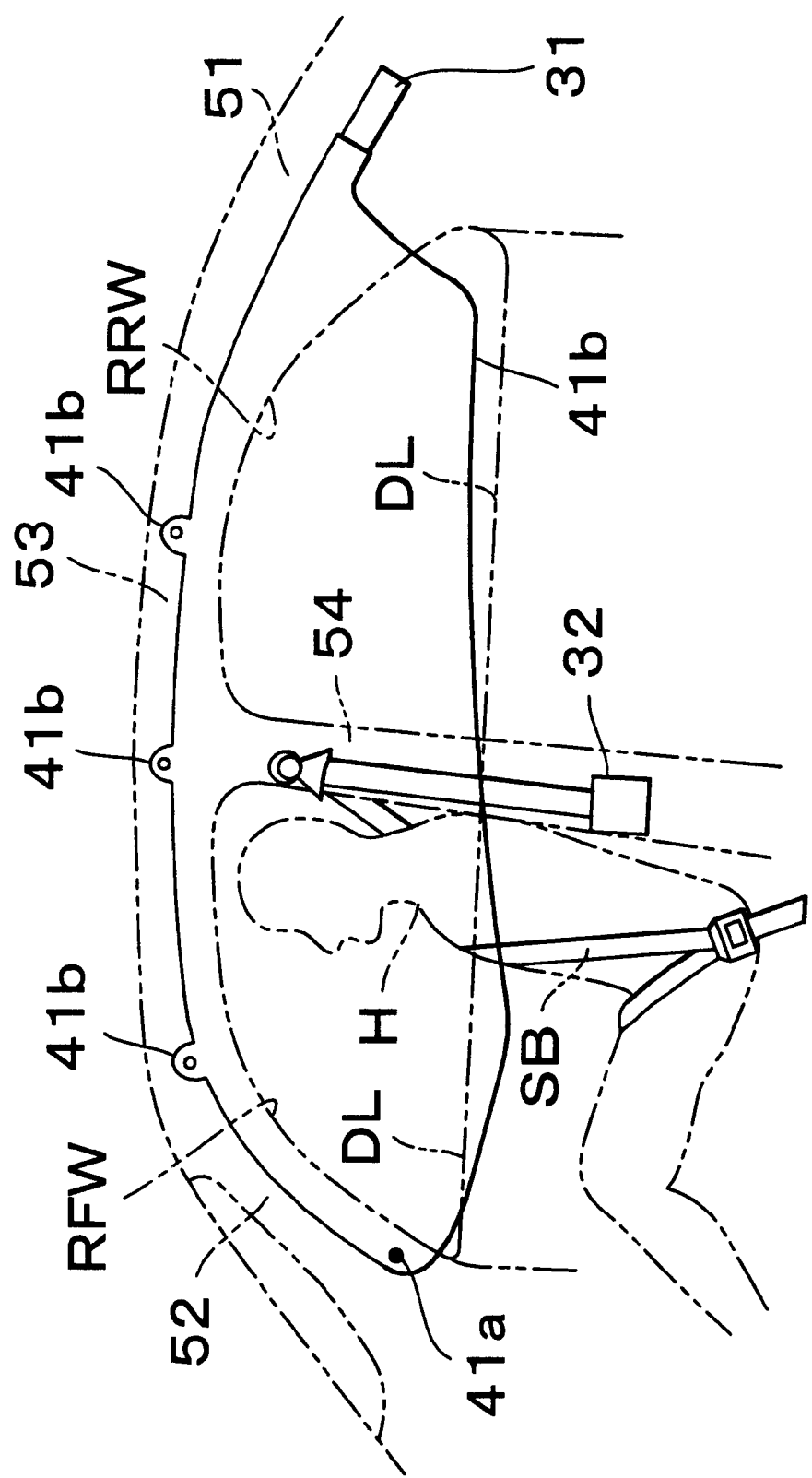
FIG. 5 is a fragmentary side view of the vehicle, showing the airbag of FIG. 4 in its inflated state.

The right-side pre-tensioner 32 is attached to a lower portion of a center pillar 54, as shown in FIGS. 4 and 5, and is operated in response to a drive signal received from the electric control device 10 (shown in FIG. 1), to wind up a seat belt SB for thereby tightening the seat belt SB in a short time.

The left-side inflator 33 and a left-side airbag (not shown) inflated by the left-side inflator 33 are similar in construction and function to the right-side inflator 31 and right-side airbag 41, and no further description of the left-side inflator 33 and the left-side airbag is deemed necessary. It will be understood that the vehicle-occupant protecting apparatus includes a plurality of vehicle-occupant protecting devices in the form of the right-side inflator 31, right-side airbag 41, right-side pre-tensioner 32, left-side inflator 33, left-side airbag and left-side pre-tensioner 34.

There will next be described the control system for the vehicle-occupant protecting apparatus constructed as described above. The CPU 10a is arranged to repeatedly execute, with a predetermined cycle time, a control program (control routine) illustrated in the flow chart of FIG. 6. Each cycle of execution of the program is initiated with step 600, which is followed by step 605 to determine whether the vehicle-occupant protecting apparatus (right-side inflator 31 and right-side pre-tensioner 32, and left-side inflator 33 and the left-side pre-tensioner 34) is in a non-operated state, more precisely, whether all of the devices 31, 32, 33, 34 of the apparatus are placed in their non-operated state or at rest.

If the vehicle-occupant protecting apparatus is in the non-operated state, the CPU 10a obtains an affirmative decision (YES) in step 605, and goes to step 610 to read the lateral acceleration value GY, and then to step 615 to read the roll rate RR. Then, the CPU 10a goes to step 620 to calculate a roll angle RA of the vehicle by integrating the roll rate RR.

Figure 7:
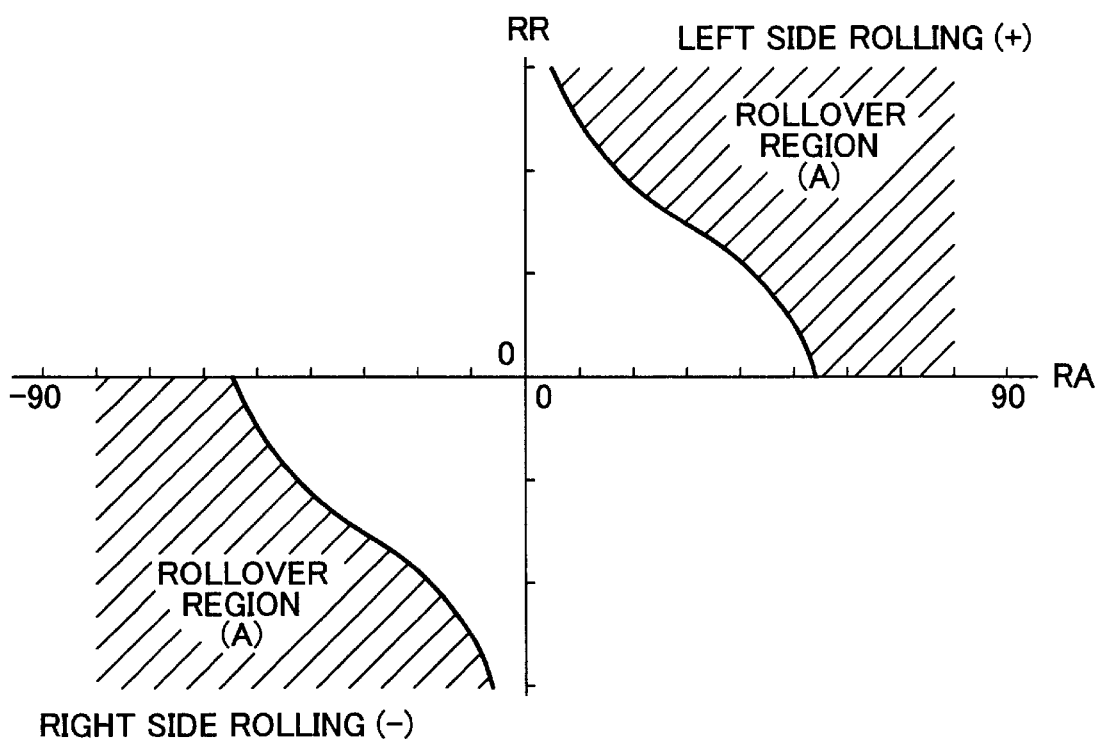
FIG. 7 is a view indicating a data map used by the CPU to detect a rollover motion of the vehicle in the first embodiment.

Then, the CPU 10a goes to step 625 to determine whether a point determined by the roll angle RA calculated in step 620 and the roll rate RR read in step 615 lies in a predetermined roller-over region (A) defined by a data map indicated in FIG. 7. The point indicated above represents a running state of the vehicle. The rollover region (A) consists of areas in a two-dimenional coordinate system of the roll angle RA and the roll rate RR, which areas are defined by threshold lines (indicated by thick solid lines in FIG. 7) representing a relationship between the roll angle RA and the roll rate RR and do not include the origin of the coordinate system. These threshold lines indicate an upper limit of the roll angle RA which varies with the roll rate RR and above which it is considered that the vehicle is suffering from a rollover motion.

Figure 8:
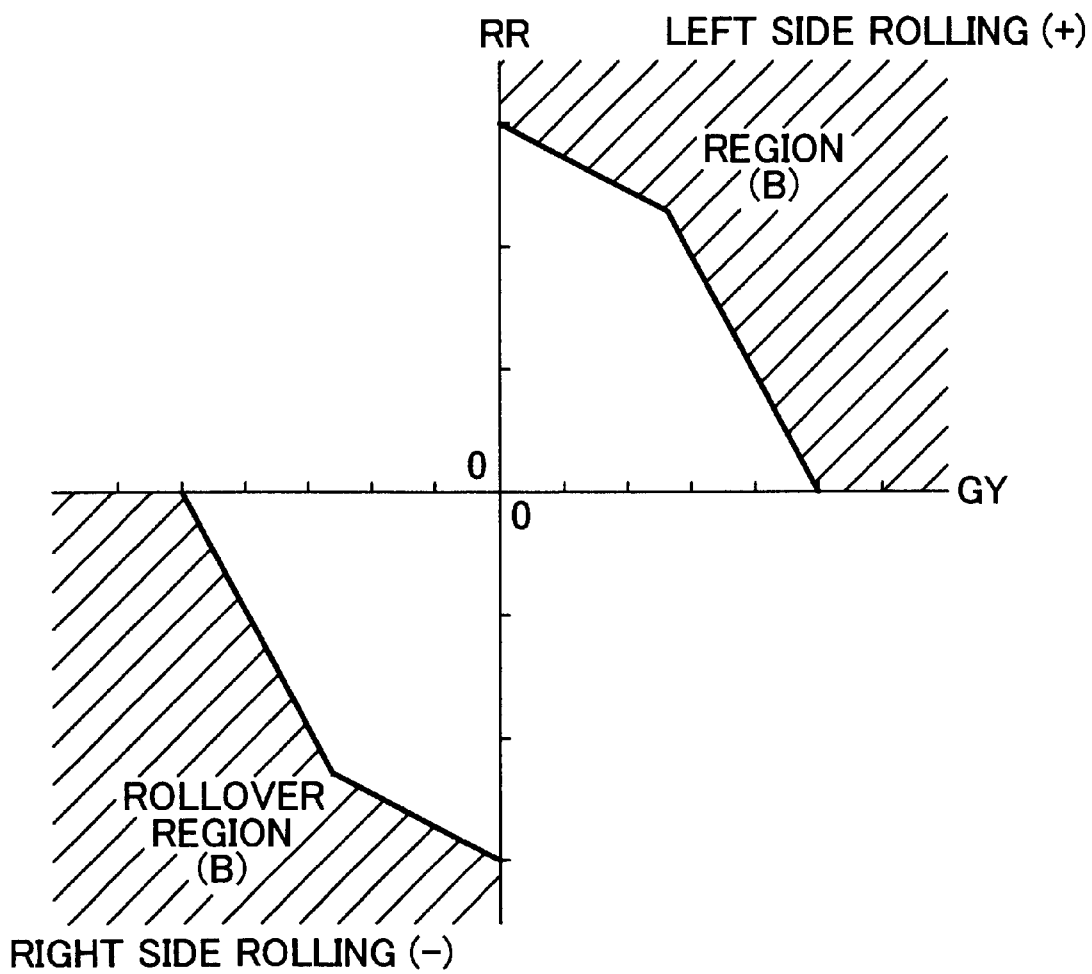
FIG. 8 is a view indicating a data map also used by the CPU to detect the rollover motion of the vehicle in the first embodiment.

If the vehicle does not have a rollover motion, that is, if the point determined by the roll angle RA and the roll rate RR does not lie in the predetermined rollover region (A), the CPU 10a obtains a negative decision (NO) in step 625, and goes to step 630 to determine whether a point determined by the lateral acceleration value GY read in step 610 and the roll rate RR read in step 615 lies in a predetermined rollover region (B) defined by a data map indicated in FIG. 8. The rollover region (B) consists of areas in a two-dimenional coordinate system of the lateral acceleration value GY and the roll rate RR, which areas are defined by threshold lines (indicated by thick solid lines in FIG. 8) representing a relationship between the lateral acceleration value GY and the roll rate RR and do not include the origin of the coordinate system.

Figure 6:
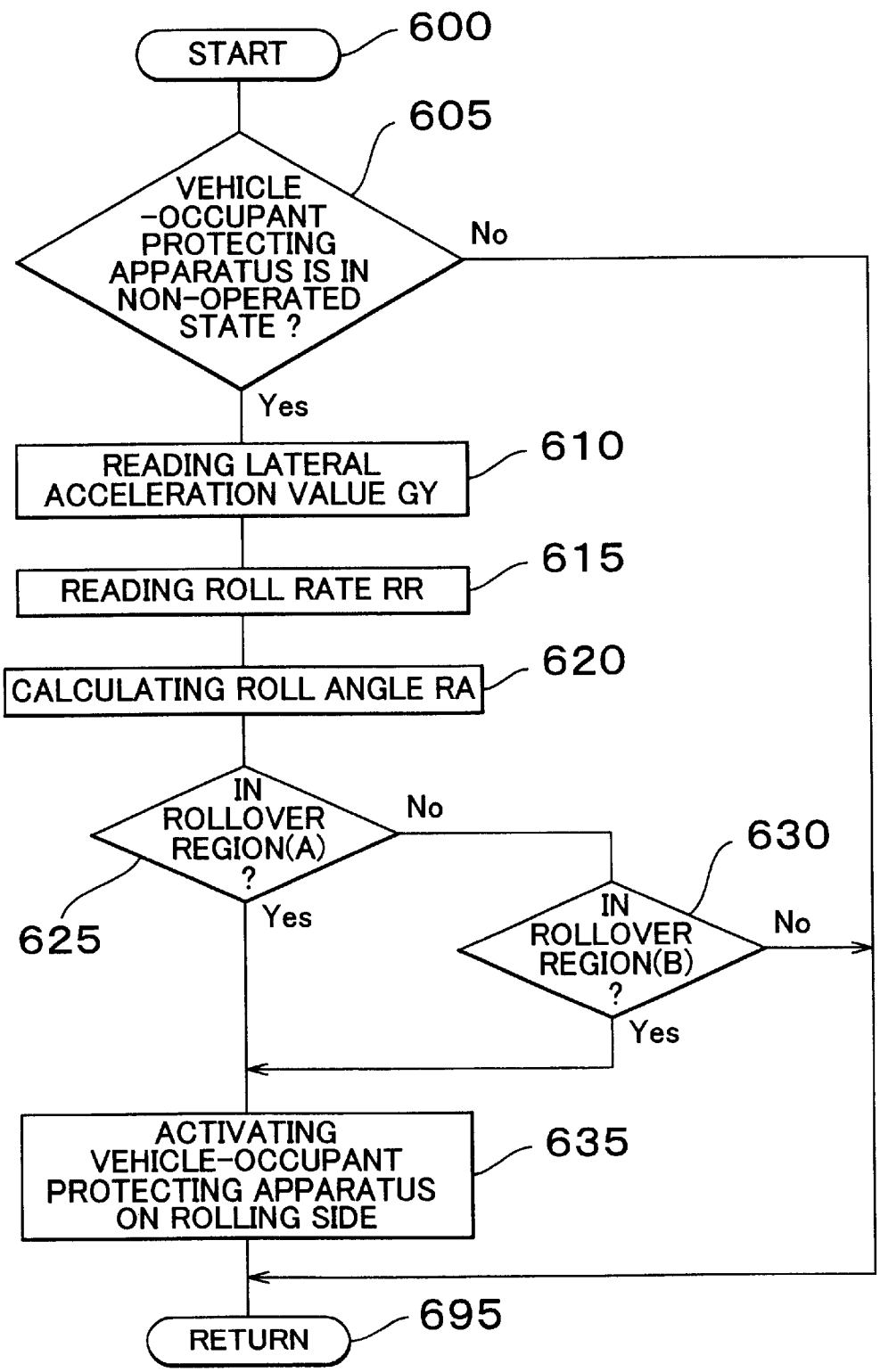
FIG. 6 is a flow chart illustrating a program executed by a CPU in a first embodiment of this invention.

If the vehicle does not have a rollover motion, as described above, the point determined by the lateral acceleration value GY and the roll rate RR does not lie in the predetermined rollover region (B), either, and the CPU 10a obtains a negative decision (NO) in step 630 and goes to step 695 to terminate one cycle of execution of the control routine of FIG. 6.

If the vehicle starts a rolling action, and the point determined by the roll angle RA and the roll rate RR has moved into the predetermined rollover region (A), the CPU 10a obtains an affirmative decision (YES) in step 625 after implementation of steps 600–620, and goes to step 635 to operate only the vehicle-occupant protecting devices 31, 32, 33, 34 of the vehicle-occupant protecting apparatus, which are disposed the rolling side of the vehicle corresponding to the rolling direction. Described more precisely, the CPU 10a operates only the right-side inflator and pre-tensioner 31, 32 if the vehicle has a rollover motion in the right direction, or only the left-side inflator and pre-tensioner 33, 34 if the vehicle has a rollover motion in the left direction.

Then, the CPU 10a starts the next cycle of execution of the control routine of FIG. 6, and obtains a negative decision (NO) in step 605, and directly goes to step 695 to terminate one cycle of execution of the control routine.

There will be described a case wherein the point determined by the lateral acceleration value GY and the roll rate RR falls within the predetermined rollover region (B) before the point determined by the roll angle RA and the roll rate RR falls within the predetermined rollover region (A), and therefore before the vehicle-occupant protecting apparatus is operated. In this case, the CPU 10a obtains a negative decision (NO) in step 625 following implementation of steps 600–620, and an affirmative decision (YES) in step 630, and therefore goes to step 635 to activate only the vehicle-occupant protecting devices 31, 32, 33, 34 of the vehicle-occupant protecting apparatus which are disposed on the rolling side on which the vehicle rolls over.

In the next cycle of execution of the control routine of FIG. 6, the CPU 10a obtains a negative decision (NO) in step 605, and directly goes to step 695 to terminate the cycle.

As described above, the control system according to the present embodiment is arranged to determine or detect that a rollover motion of the vehicle takes place, when the point determined by the roll angle RA and the roll rate RR lies in the predetermined rollover region (A), or when the point determined by the lateral acceleration value GY and the roll rate RR lies in the predetermined rollover region (B). The control system operates only the vehicle-occupant protecting devices of the vehicle-occupant protecting apparatus on the rolling side of the vehicle.

Referring next to FIGS. 9A–9E, different types or forms of the rollover motion of the vehicle will be explained. The rollover motion indicated in FIG. 9A is called a "trip-over" motion, which takes place due to collision of the vehicle wheel or wheels with stationary objects such as edge blocks arranged along an edge of a roadway, or due to running of the vehicle with its wheel or wheels slipping laterally on a ground or paved roadway surface so as to sweep and accumulate earth and sand on the outer side of the vehicle wheel, for example. The rollover motion indicated in FIG. 9B is called a "turn-over" motion, which takes place due to a centrifugal force generated during turning of the vehicle. The rollover motion indicated in FIG. 9C is called a "flip-over" motion, which takes place due to running of a wheel or wheels of the vehicle on an inclined roadway surface. The rollover motion indicated in FIG. 9D is called a "bounce-over" motion, which takes place due to bouncing of the vehicle following a collision of the vehicle wheel or wheels with a wall, for instance. The rollover motion indicated in FIG. 9E is called a "fall-over" motion, which takes place due to falling of the vehicle laterally outwardly beyond an edge of a roadway. Thus, there are various types of rollover motion of an automotive vehicle.

Of these types of rollover motion, the trip-over motion of FIG. 9A, turn-over motion of FIG. 9B and bounce-over motion of FIG. 9D are primarily caused by the lateral acceleration GY of the vehicle. However, the determination as to whether the vehicle has a rollover motion or not is preferably effected on the basis of the roll rate RR as well as the lateral acceleration value GY, since the roll rate RR indicates initiation of the rollover motion.

On the other hand, the flip-over motion of FIG. 9C and the fall-over motion of FIG. 9E are caused by an increase of the roll angle RA. However, the roll angle RA may become relatively large during long running of the vehicle on a bank. In this respect, the determination as to whether the vehicle has a rollover motion is preferably effected on the basis of the roll rate RR as well as the roll angle RA.

In view of the above, the present embodiment is arranged to make the determination on the basis of the roll angle RA and the roll rate RR in step 625 of FIG. 6 and according to the rollover region (A) of FIG. 7, and the determination on the basis of the lateral acceleration value GY and the roll rate RR in step 630 of FIG. 6 and according to the rollover region (B) of FIG. 8. This arrangement permits an improvement in the accuracy of determination or detection of a rollover motion of the vehicle, and a reduction in the required time for the determination.

Figure 10:
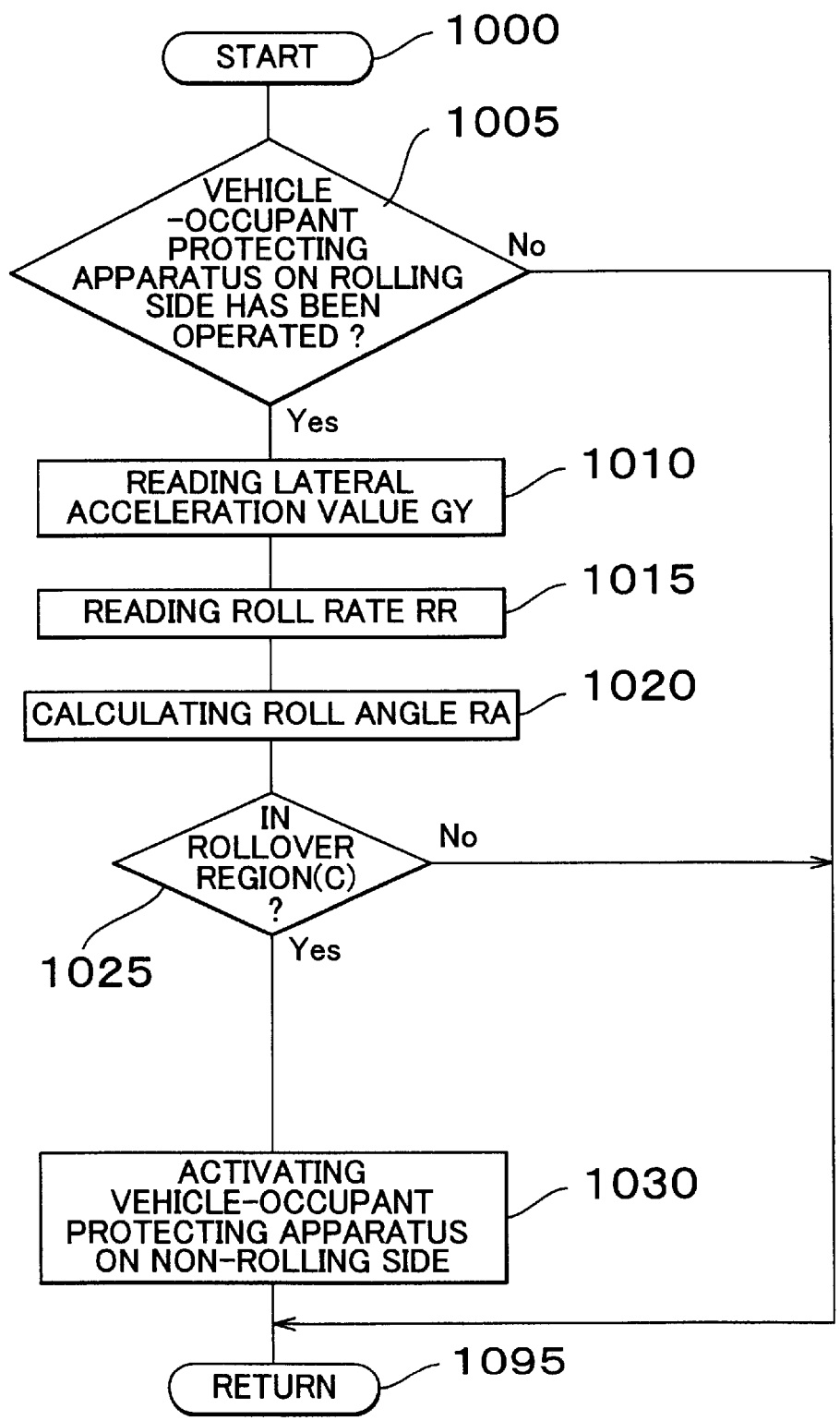
FIG. 10 is a flow chart illustrating a program executed by the CPU in the first embodiment of the invention.

Next, there will be described an operation of the control system of the present embodiment after the appropriate vehicle-occupant protecting devices are operated in response to the detection of a rollover motion of the vehicle. The CPU 10a is arranged to also repeatedly execute, with a predetermined cycle time, a control program (control routine) illustrated in the flow chart of FIG. 10. This control program is initiated with step 1000, which is followed by step 1005 to determine whether the vehicle-occupant protecting devices on the rolling side of the vehicle have been placed in the operated state. If the appropriate vehicle-occupant protecting devices have not been placed in the operated state, the CPU 10a obtains a negative decision (NO) in step 1005, and goes to step 1095 to terminate one cycle of execution of the present control routine.

If the appropriate vehicle-occupant protecting devices have been placed in the operated state, the CPU 10a obtains an affirmative decision (YES) in step 1005, and goes to step 1010 to read the lateral acceleration value GY and then to step 1015 to read the roll rate RR. Then, the CPU 10a goes to step 1020 to calculate the roll angle RA by integrating the roll rate RR.

Figure 11:
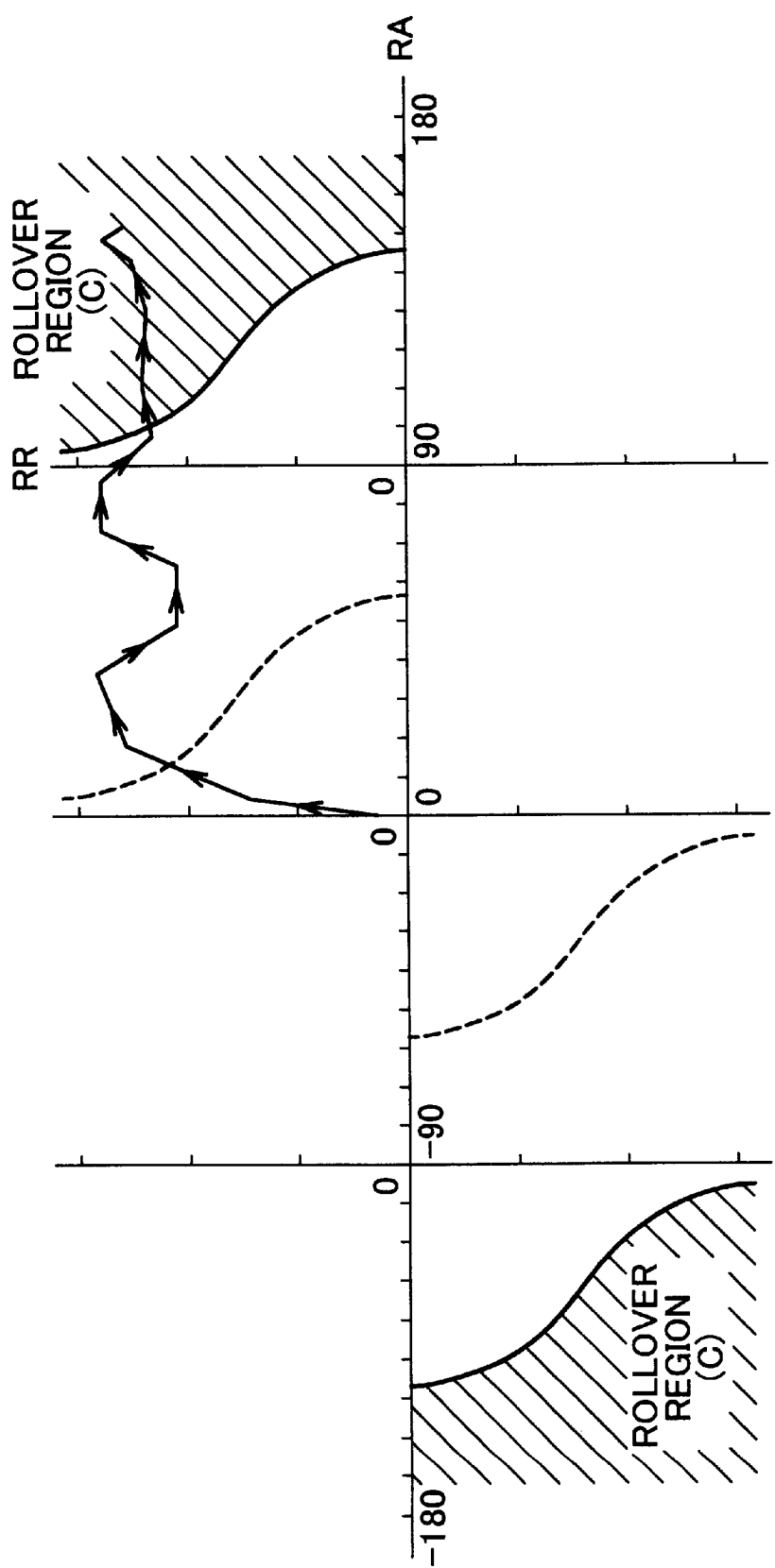
FIG. 11 is a view indicating a data map used by the CPU to detect a serious rollover motion of the vehicle.

The CPU 10a then goes to step 1025 to determine whether a point determined by the roll angle RA calculated in step 1020 and the roll rate RR read in step 1015 lies in a predetermined rollover region (C) defined by a data map indicated in FIG. 11. The rollover region (C) is defined by threshold lines which are shifted with respect to the threshold lines (indicated by broken lines in FIG. 11) defining the rollover region (A), by a roll angle of 90° in the direction of increasing the roll angle RA, as indicated by thick solid lines in FIG. 11. A fact that the point determined by the roll angle RA and the roll rate RR lies within the predetermined rollover region (C) indicates a high possibility that the rollover which has been initiated will continue and eventually develop into a serious state involving the roll angle RA of 180° or larger.

If the point determined by the roll angle RA and the roll rate RR does not lie in the predetermined rollover region (C) although the rollover motion continues, the CPU 10a obtains a negative decision (NO) in step 1025, and the goes to step 1095 to terminate one cycle of execution of the present control routine. Thereafter, the CPU 10a repeatedly implements steps 1000–1025 and step 1095, to monitor whether the point determined by the actual roll angle RA and the actual roll rate RR has moved into the predetermined rollover region (C).

Therefore, if the point determined by the roll angle RA and the roll rate RR has moved into the rollover region (C) as a result of the continuing rollover motion of the vehicle, the CPU 10a obtains an affirmative decision (YES) in step 1025, and goes to step 1030 to operate the vehicle-occupant protecting devices of the vehicle-occupant protecting apparatus on the other side or non-rolling side of the vehicle, that is, the vehicle-occupant protecting devices which have not been operated. Namely, if the point determined by the roll angle RA and the roll rate RR has moved into the predetermined rollover region (C), the CPU 10a determines that the rollover motion of the vehicle will develop into a serious state, and operates the non-operated vehicle-occupant protecting devices.

Figure 12:
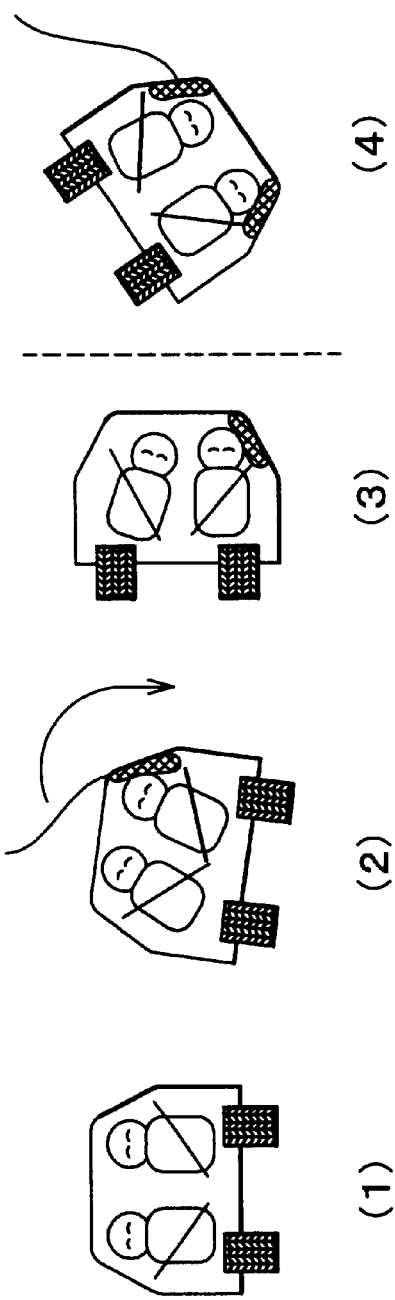
FIG. 12 is an illustration depicting operations of vehicle-occupant protecting devices of the protecting apparatus under the control of the control system shown in FIG. 1.

Reference is now made to FIG. 12 depicting an example of a development of the rollover motion, which has been initiated in a normal state of the vehicle indicated at (1) in the figure, for some reason or other. Upon initiation of the rollover motion, the vehicle-occupant protecting devices on the rolling side of the vehicle are operated as indicated at (2) in FIG. 12. If the rollover motion continues and develops from a state indicated at (3) in FIG. 12 into a serious state indicated at (4), the non-operated vehicle-occupant protecting devices on the non-rolling side of the vehicle are operated.

If the rollover motion remains in the state indicated at (3) in FIG. 12 while the point determined by the roll angle RA and the roll rate RR remains outside the rollover region (C), the non-operated vehicle-occupant protecting devices on the non-rolling side of the vehicle are not operated. In other words, if the roll-motion will not develop from the state (3) of FIG. 12 into the state (4) of FIG. 12, only the vehicle-occupant protecting devices on the rolling side of the vehicle are operated, while the other vehicle-occupant protecting devices on the non-rolling side of the vehicle are not operated. Thus, the present arrangement prevents unnecessary operations of the non-operated vehicle-occupant protecting devices, and consequently saves the repairing cost of the vehicle. It is noted that the rollover motion indicated at (4) in FIG. 12 is referred to herein as a "serious rollover motion" and that a development of the rollover motion from the state (3) into the state (4) means an occurrence of the serious rollover motion.

A second embodiment of this invention will be described. The control system according to the second embodiment is different from the control system of the first embodiment only in that the CPU 10a is adapted to repeatedly execute a control program or routine illustrated in FIG. 13 with a predetermined cycle time, in place of the control routine illustrated in the flow chart of FIG. 10. The operation of the control system according to the second embodiment will be described by reference to FIG. 13.

Figure 13:
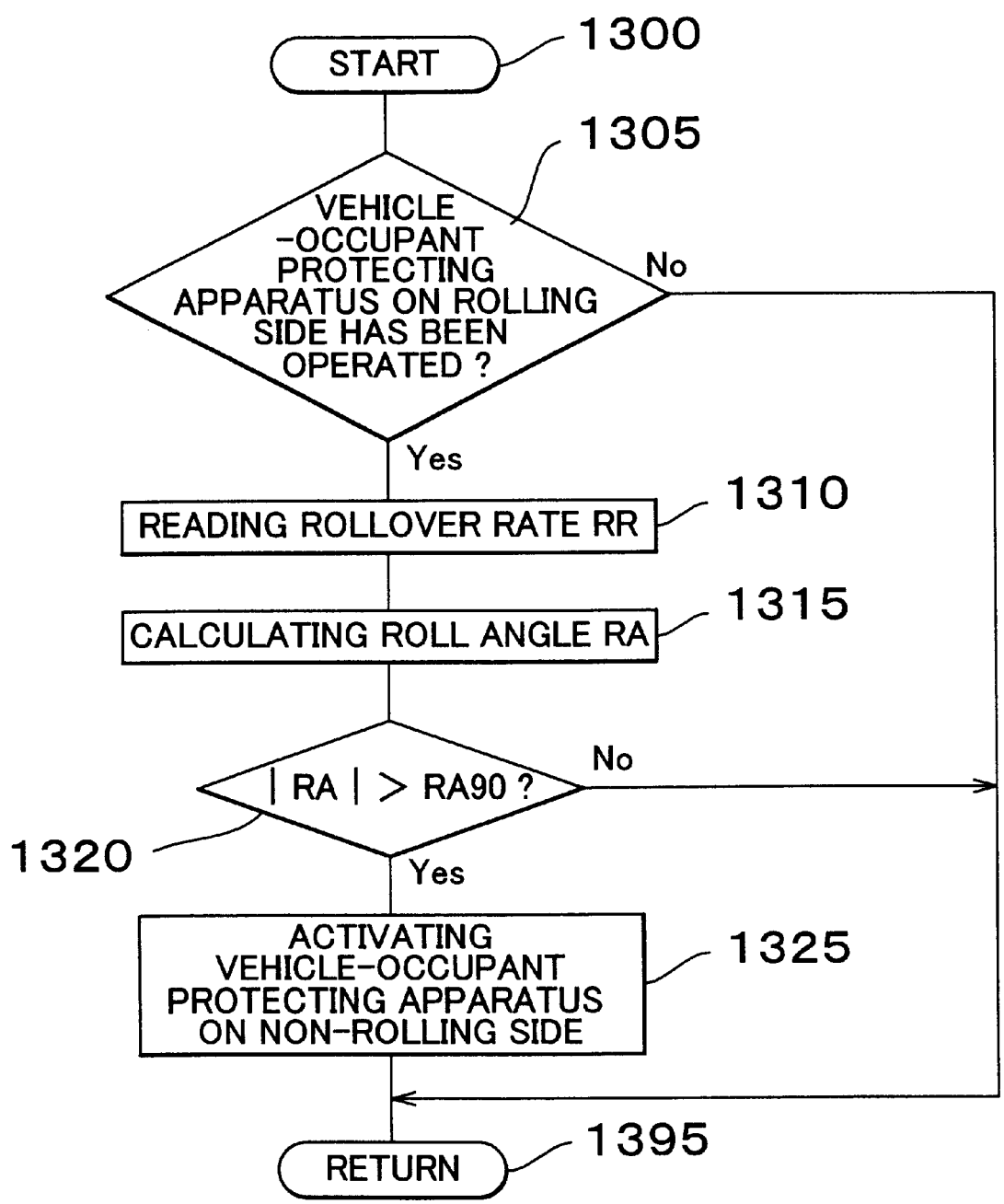
FIG. 13 is a flow chart illustrating a program executed by the CPU in a second embodiment of this invention.

The control routine of FIG. 13 is initiated with step 1300, which is followed by step 1305 to determine whether the vehicle-occupant protecting devices on the rolling side of the vehicle have been placed in the operated state. If the vehicle-occupant protecting devices have not been placed in the operated state, the CPU 10a obtains a negative decision (NO) in step 1305, and goes to step 1395 to terminate one cycle of execution of the present control routine.

If the vehicle-occupant protecting devices on the rolling side of the vehicle have been placed in the operated state, the CPU 10a obtains an affirmative decision (YES) in step 1305, and goes to step 1310 to read the roll rate RR. Then, the CPU 10a goes to step 1315 to calculate the roll angle RA by integrating the roll rate RR.

The CPU 10a then goes to step 1320 to determine whether an absolute value of the roll angle RA calculated in step 1315 is larger than a predetermined threshold RA90. This threshold is selected within a range between 90° and 120°. For example, the threshold is determined to be 100°. A fact that the absolute value of the roll angle RA is larger than the predetermined threshold indicates a high possibility that the rollover motion which has been initiated will continue and eventually develop into a serious rollover motion involving the roll angle RA of 180° or larger.

If the roll angle RA remains smaller than the predetermined threshold during the continuing rollover motion, the CPU 10a obtains a negative decision (NO) in step 1320, and goes to step 1395 to terminate one cycle of execution of the present control routine. Thereafter, the CPU 10a continues to repeatedly implement steps 1300–1320 and 1395, to monitor whether the roll angle RA has exceeded the threshold. Therefore, if the roll angle RA has exceeded the threshold during the continuing rollover motion, the CPU 10a obtains an affirmative decision (YES) in step 1320, and goes to step 1325 to operate the non-operated vehicle-occupant protecting devices on the non-rolling side of the vehicle.

Figure 14:
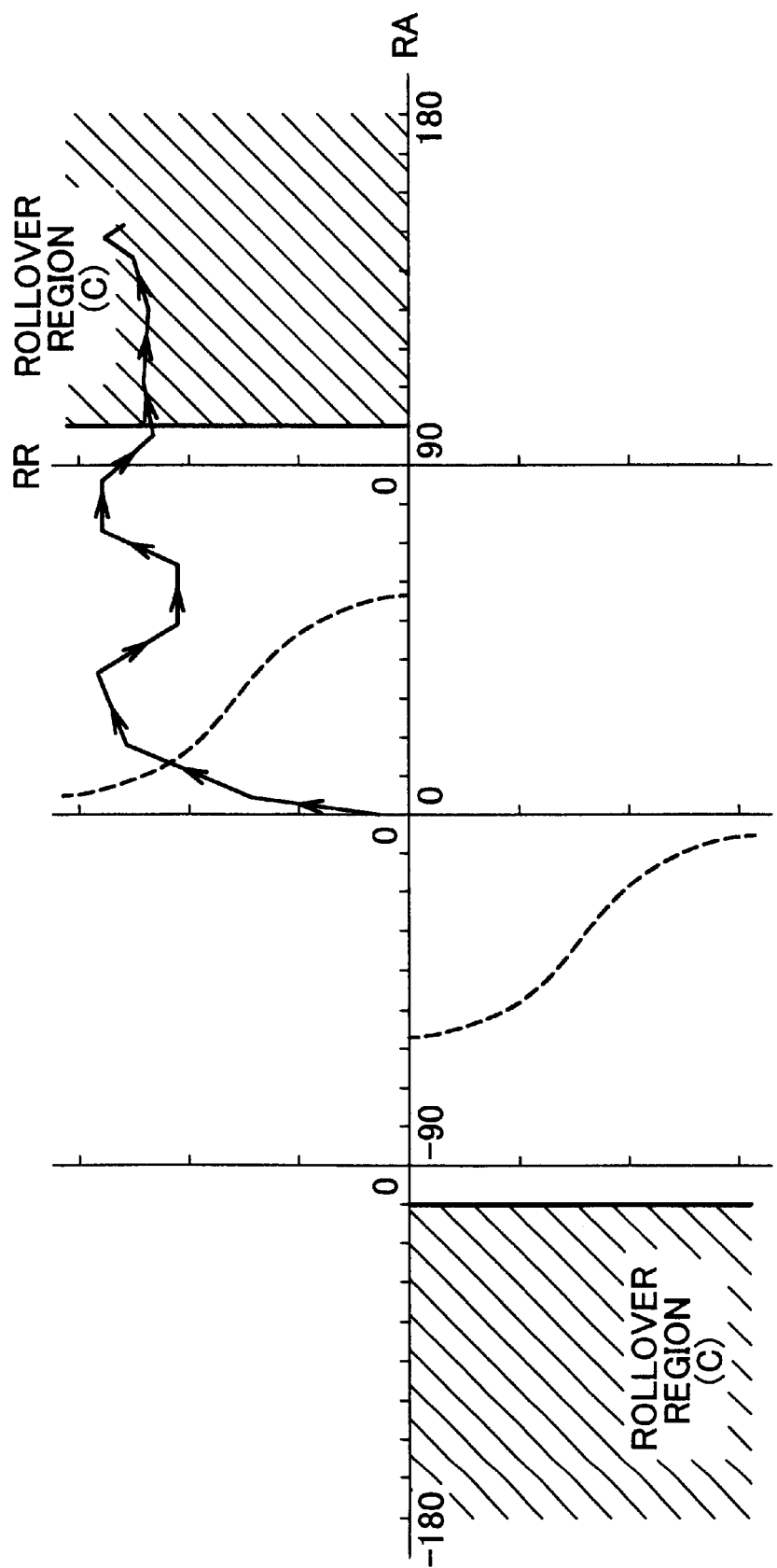
FIG. 14 is a view indicating a data map which can be used by the CPU to detect a serious rollover motion of the vehicle in the second embodiment.

If the rollover motion of the vehicle will not develop into a serious state with the absolute value of the roll angle RA held not larger than the predetermined threshold, the CPU 10a obtains a negative decision (NO) in step 1320, and goes to step 1395, so that the non-operated vehicle-occupant protecting devices on the non-rolling side of the vehicle are kept in the non-operated state. In other words, the second embodiment is also arranged to operate only the vehicle-occupant protecting devices on the rolling side of the vehicle, while holding the other vehicle-occupant protecting devices in the non-operated state, if the rollover motion of the vehicle will not develop from the state indicated at (3) in FIG. 12 into the state indicated at (4). This arrangement prevents unnecessary operations of the vehicle-occupant protecting devices on the non-rolling side of the vehicle, and consequently saves the repairing cost of the vehicle. The second embodiment is practically considered to make the determination in step 1320, according to a predetermined rollover region (C) defined by a data map indicated in FIG. 14, in place of the rollover region (C) defined by the data map of FIG. 11. According to the rollover region (C) of the data map of FIG. 14, the threshold of the roll angle RA does not vary with the roll rate RR.

Figure 15:
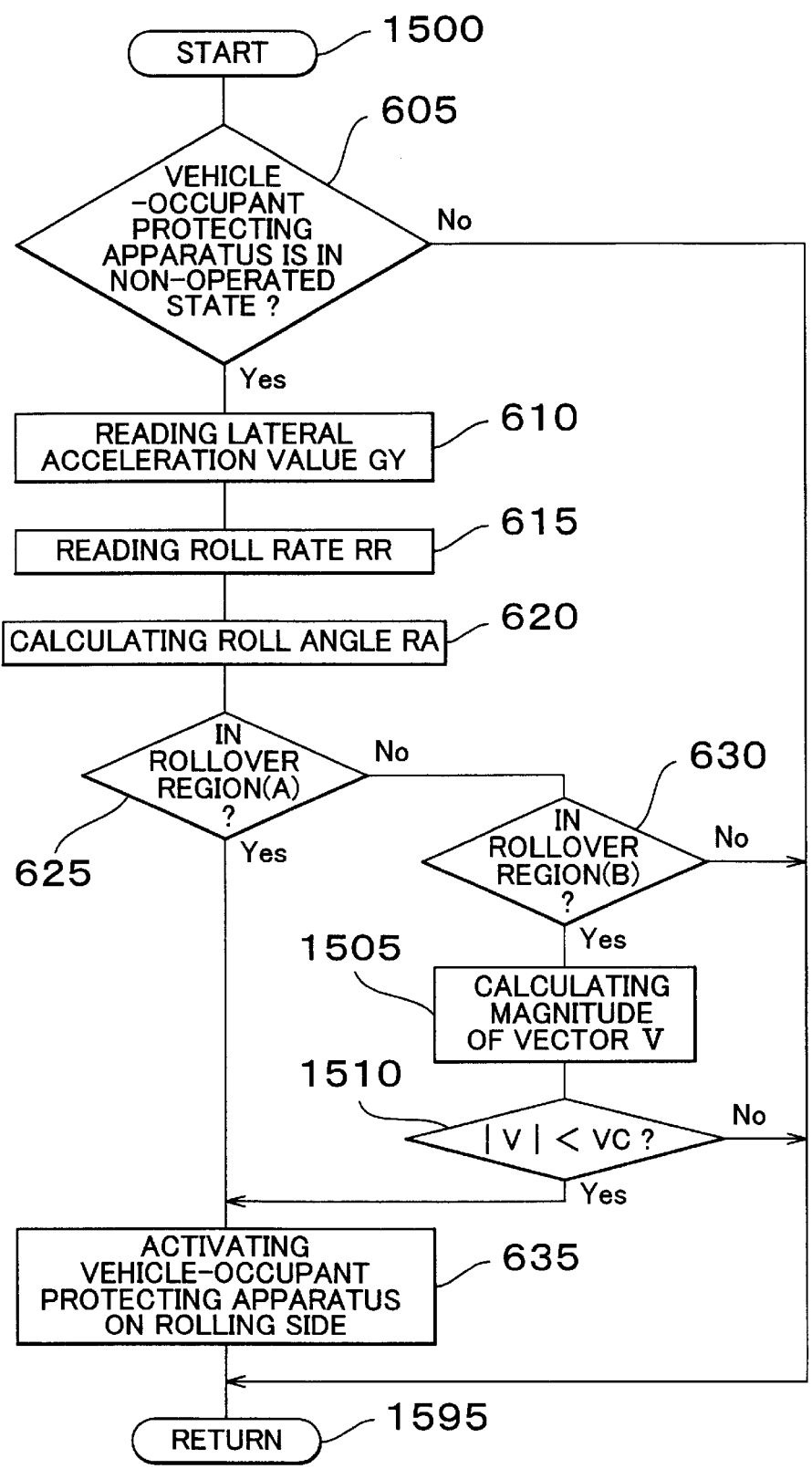
FIG. 15 is a flow chart illustrating a program executed by the CPU in a third embodiment of the present invention.

A third embodiment of this invention will be described. This third embodiment is different from the first embodiment only in that the CPU 10a is adapted to repeatedly execute a control program or routine illustrated in the flow chart of FIG. 15, with a predetermined cycle time, in place of the control routine illustrated in the flow chart of FIG. 6. Accordingly, only the aspects of the third embodiment which are different from the first embodiment will be described by reference to FIG. 15. In the third embodiment of FIG. 15, the same step numbers as used in FIG. 6 are used to identify the same steps, which will not be described again to avoid redundancy.

The third embodiment also uses the rollover regions (A) and 03) defined by the data maps shown in FIGS. 7 and 8, to determine whether a rollover motion of the vehicle has taken place. In the third embodiment, however, the vehicle-occupant protecting devices on the rolling side of the vehicle will not be operated as in the first embodiment, even when the point defined by the lateral acceleration value GY and the roll rate RR has moved into the rollover region (B). In this case, the CPU 10a determines whether another condition for operating the protecting devices on the rolling side is satisfied or not, as described below.

Described more specifically, after starting in step 1500, and proceeding to step 630, if the point determined by the lateral acceleration value GY and the roll rate RR has moved into the predetermined rollover region (B) of FIG. 8, the CPU 10a obtains an affirmative decision (YES) in step 630, and goes to step 1505 to calculate a magnitude of a vector V having a start point determined by the lateral acceleration value GY and the roll rate RR which were read in steps 610 and 615 in the last cycle of execution of the present routine, and an end point determined by the lateral acceleration value GY and the roll rate RR which are read in the steps 610 and 615 in the present cycle of execution. Then, the CPU 10a goes to step 1510 to determine whether an absolute value of the vector V is smaller than a predetermined threshold VC. If the absolute value of the vector V is equal to or larger than the threshold VC, the CPU 10a goes directly to step 1595 to terminate one cycle of execution of the routine. If the absolute value of the vector V is smaller than the threshold VC, the CPU 10a obtains an affirmative decision (YES) in step 1510, and goes to step 635 to operate the vehicle-occupant protecting devices on the rolling side of the vehicle.

As described above, the third embodiment is arranged to operate the vehicle-occupant protecting devices on the rolling side of the vehicle only when the absolute value of the vector V is smaller than the threshold VC, even after the point determined by the lateral acceleration value GY and the roll rate RR has fallen within the predetermined rollover region (B). In this respect, it is noted that the point determined by the lateral acceleration value GY and the roll rate RR may fall within the rollover region (B) in the event of a relatively serious or severe lateral or side collision or crashing of the vehicle, but the magnitude of the vector V tends to be relatively large. In view of this tendency, the third embodiment is arranged to determine that a rollover motion of the vehicle has taken place, only when the magnitude of the vector VC is smaller than the threshold VC. This arrangement permits a distinction between the side collision or crashing of the vehicle and the rollover motion, making it possible to adequately operate the vehicle-occupant protecting devices on the rolling side of the vehicle. The magnitude of the vector V may be considered to be a value corresponding to the lateral acceleration value GY when the point determined by the lateral acceleration value GY and the roll rate RR moves across the threshold lines defining the rollover region (B).

There will next be described a fourth embodiment of the present invention. This fourth embodiment is different from the preceding embodiments in that the fourth embodiment uses a right-side head-position sensor 23 shown in FIG. 16, and a left-side head-position sensor not shown, and that the CPU 10a is arranged to repeatedly execute a control program or routine illustrated in the flow chart of FIG. 17, with a predetermined cycle time, in place of the control routine illustrated in the flow chart of FIG. 6. Accordingly, only the aspects of the fourth embodiments which are different from the preceding embodiments will be described by reference to FIGS. 16 and 17. In the fourth embodiment of FIG. 17, the same step numbers as used in FIG. 6 are used to identify the same steps, which will not be described to avoid redundancy.

Figure 16:
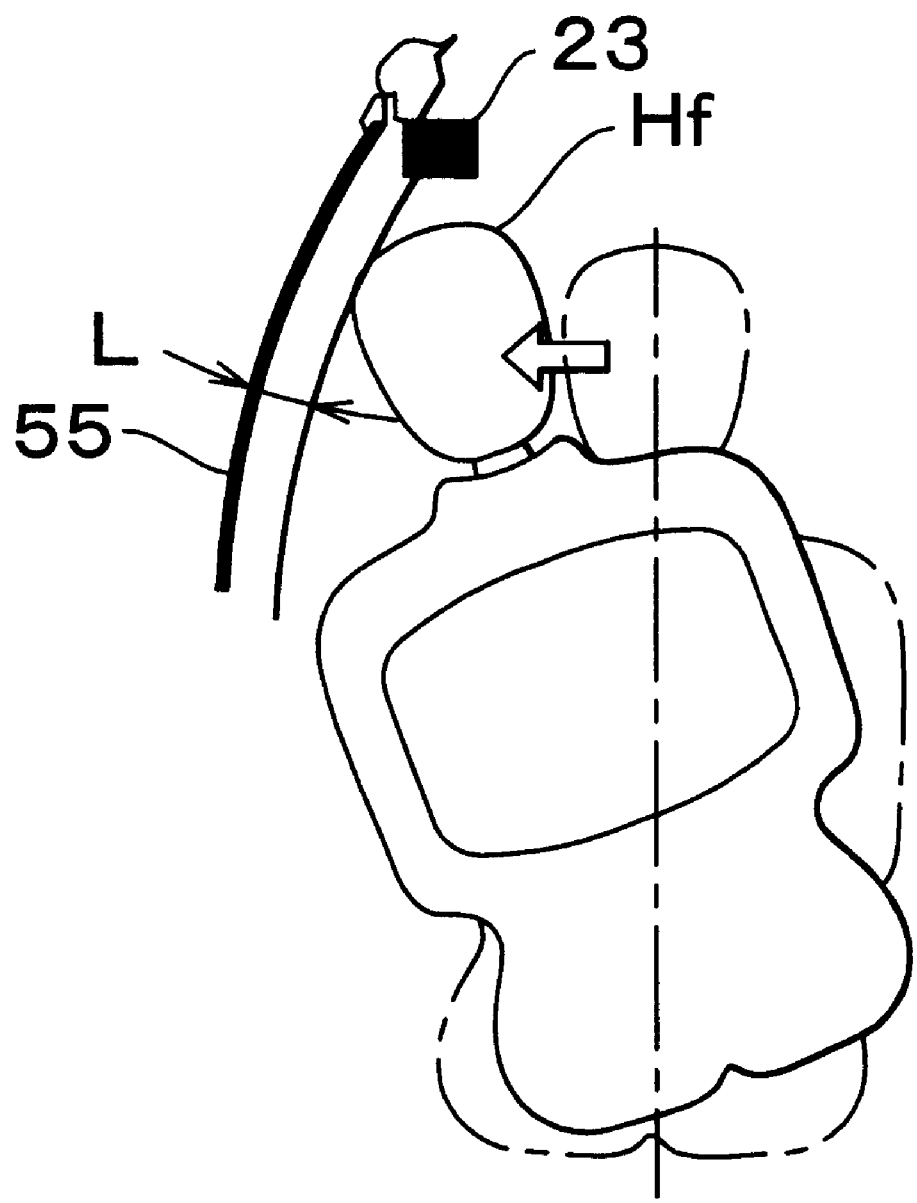
FIG. 16 is a view showing a head-position sensor used in a fourth embodiment of the invention.

The right-side head-position sensor 23 shown in FIG. 16 is a distance sensor such as a ultrasonic sensor, which is arranged to measure a distance L between a head portion Hf of a vehicle occupant on the right side of the vehicle, and a right-side portion 55 of the vehicle body, more precisely, a right-side inner surface of a compartment within the vehicle body. The electric control device 10 shown in FIG. 1, more precisely, the input port 10d receives an output signal of the sensor 23 indicative of the distance L. Similarly, the left-side head-position sensor is arranged to measure a distance L between the head portion Hf of a vehicle occupant on the left side of the vehicle and a left-side inner surface of the compartment, and the electric control device 10 (input port 10d) receives an output signal of this left-side head-position sensor indicative of the distance L.

Figure 17:
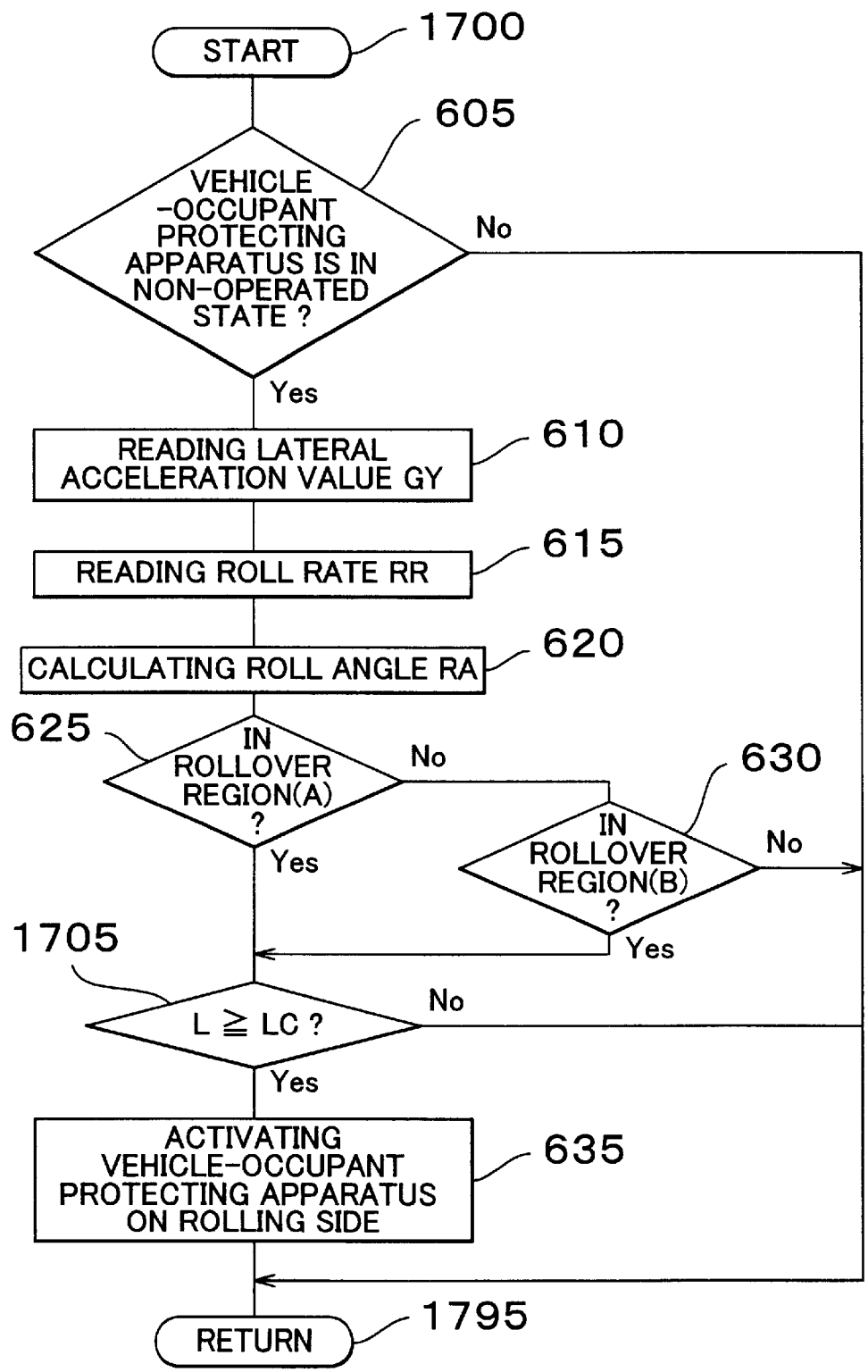
FIG. 17 is a flow chart illustrating a program executed by the CPU in a fourth embodiment of the invention.

The control routine of FIG. 17, which starts with step 1700, is arranged to make a determination in steps 625 and 630 as to whether a rollover motion of the vehicle has taken place. This determination is made according to the predetermined rollover regions (A) and (B) defined by the data maps shown in FIGS. 7 and 8. However, the present control routine is arranged not to operate the vehicle-occupant protecting devices on the rolling side of the vehicle, when the distance L detected by one of the right-side head-position sensor 23 and the left-side head-position sensor which is located on the rolling side of the vehicle is smaller than a predetermined threshold LC, even if the point determined by the roll angle RA and the roll rate RR lies in the rollover region (A) of FIG. 7, or even if the point determined by the lateral acceleration value GY and the roll rate RR lies in the rollover region (B) of FIG. 8. Rather, in such a situation, the routine proceeds to step 1795. On the other hand, the control routine of FIG. 17 is arranged to operate, in step 635, the rolling-side vehicle-occupant protecting devices only when the rolling-side distance L is equal to or larger than the threshold LC, while the above-indicated point lies in the rollover region (A) or (B), namely, only when an affirmative decision (YES) is obtained in step 1705.

Thus, the fourth embodiment is arranged to operate the right-side airbag 41 or the left-side airbag only when there is a sufficient space for inflating the airbag between the head portion Hf and the side portion of the vehicle body. This arrangement permits sufficient protection of the head portion Hf.

However, the fourth embodiment may be modified to operate the rolling-side pre-tensioner 32 or 34, or both of the right-side and left-side pre-tensioners 32 and 34, irrespective of the distance L detected by the right-side head-position sensor 23 or the left-side head-position sensor, when the point determined by the roll angle RA and the roll rate RR has fallen within the rollover region (A) or when the point determined by the lateral acceleration value GY and the roll rate RR has fallen within the rollover region (B).

The first through fourth embodiments described above are arranged to determine that a rollover motion (at least an initial rollover motion which is not a "serious rollover motion") of the vehicle has taken place, when the point determined by the roll angle RA and the roll rate RR has fallen within the rollover region (A) or when the point determined by the lateral acceleration value GY and the roll rate RR has fallen within the rollover region (B). This arrangement permits accurate detection of a rollover motion of the vehicle.

The illustrated embodiments are further arranged to first operate only the vehicle-occupant protecting devices on the rolling side of the vehicle, and then operate the vehicle-occupant protecting device on the non-rolling side of the vehicle, when it is determined that the initiated rollover motion involves a roll angle RA exceeding about 90° and is expected to develop into a serious rollover motion which causes the roof of the vehicle to face more or less downwards. This arrangement prevents unnecessary operation of the vehicle-occupant protecting devices on the non-rolling side of the vehicle, and permits reduction of the repairing cost of the vehicle.

The above-indicated steps 600–630 function such that a determination as to whether the vehicle is suffering from a rollover motion or whether a rollover motion of the vehicle has taken place is effected on the basis of appropriate physical quantities (roll angle RA, roll rate RR and lateral acceleration value GY) indicative of the running condition of the vehicle. Further, step 635 functions to control the rolling-side vehicle-occupant protecting devices, and steps 1000–1025 or steps 1300–1325 are implemented to make a determination as to whether the rollover motion which has been detected in steps 600–630 is expected to develop into a serious rollover motion. Further, step 1030 or 1325 functions to operate the non-rolling side vehicle-occupant protecting devices, after the operation of the rolling-side vehicle-occupant protecting devices.

It will be understood that the present invention is not limited to the illustrated embodiments, and may be embodied with various changes and modifications. For instance, the roll rate sensor 22 used to detect the roll rate RR may be replaced by a left-side vertical acceleration sensor and a right-side vertical acceleration sensor which are disposed on the respective left and right sides of the vehicle body and which are arranged to detect respective vertical acceleration values GZL and GZR on the respective left and right sides of the vehicle. In this respect, it is noted that the roll rate may be considered to be a difference between the detected left-side and right-side vertical acceleration values GZL and GZR. In this case, therefore, the roll rate can be obtained on the basis of the difference (GZL-GZR). It is also possible to dispose each of the inflators 31, 33 on an upper portion of the corresponding center pillar 54, and/or dispose each of the seat-belt pre-tensioners 32, 34 on the corresponding seat of the vehicle. Thus, the vehicle-occupant protecting devices such as the inflators 31, 33 and the pre-tensioners 32, 34 may be disposed at any desired positions on the vehicle body.

In the illustrated embodiments, the airbag and the seat-belt pre-tensioner which are located on the rolling side of the vehicle are operated when the point determined by the roll angle RA and the roll rate RR has fallen in the predetermined rollover region (A) or when the point determined by the lateral acceleration value GY and the roll rate RR has fallen within the predetermined rollover region (B). However, it is possible that only the rolling-side airbag is operated while the two pre-tensioners on the rolling and non-rolling sides of the vehicle are both operated.

The controller 100 of the illustrated embodiment is implemented as one or more programmed general purpose computers. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hard-wired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

In some cases, upon determining that the vehicle has the rollover motion, the present arrangement may permit simultaneous operation of the rolling side and the non-rolling side vehicle-occupant protecting devices.

While the preferred embodiments of the present invention have been described, for illustrative purpose only, it is to be understood that the invention is not limited to the details of the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A control system for controlling a vehicle-occupant protecting apparatus that includes at least two vehicle-occupant protecting devices which are disposed on respective right and left sides of an automotive vehicle, the control system comprising a controller that:

determines whether the vehicle has a rollover motion, on the basis of at least one physical quantity indicative of a running condition of the vehicle; and upon determining that the vehicle has said rollover motion, operates only at least one of the vehicle-occupant protecting devices located on a rolling side of the vehicle, without initially operating any vehicle-occupant protecting device located on a non-rolling side of the vehicle, wherein the controller, after operating the at least one rolling-side vehicle-occupant protecting device, operates at least one of the non-rolling-side vehicle-occupant protecting devices.

2. A control system according to claim 1, wherein the controller, after determining that the vehicle has said rollover motion, determines whether said rollover motion of the vehicle is expected to develop into a serious rollover motion, and said controller operates said at least one non-rolling-side vehicle-occupant protecting device upon determining the serious rollover motion.

3. A control system according to claim 2, wherein said at least one physical quantity includes a roll angle of the vehicle, and said controller determines that the vehicle has said rollover motion, when said roll angle exceeds a predetermined first threshold, and determines that said rollover motion is expected to develop into said serious rollover motion, when said roll angle exceeds a predetermined second threshold which is shifted by 90° with respect to said predetermined first threshold in a direction of said rollover motion of the vehicle.

4. A control system according to claim 3, wherein said predetermined first threshold is changed with a roll rate of the vehicle.

5. A control system according to claim 4, further comprising a head-position sensor operable to measure a distance between a head portion of an occupant of the vehicle and an inner side surface of a compartment within a body of the vehicle, and wherein said controller inhibits an operation of the vehicle-occupant protecting devices on a corresponding side of the vehicle, when said distance measured on the corresponding one of said rolling side and said non-rolling side of the vehicle is smaller than a predetermined threshold.

6. A control system according to claim 2, further comprising a head-position sensor operable to measure a distance between a head portion of an occupant of the vehicle and an inner side surface of a compartment within a body of the vehicle, and wherein said controller inhibits an operation of the vehicle-occupant protecting devices on a corresponding side of the vehicle, when said distance measured on the corresponding one of said rolling side and said non-rolling side of the vehicle is smaller than a predetermined threshold.

7. A control system according to claim 2, wherein the controller determines that said rollover motion of the vehicle is expected to develop into said serious rollover motion, when a roll angle of the vehicle exceeds a predetermined threshold.

8. A control system according to claim 7, wherein said predetermined threshold is selected within a range between 90° and 120°.

9. A control system according to claim 1, further comprising a head-position sensor operable to measure a distance between a head portion of an occupant of the vehicle and an inner side surface of a compartment within a body of the vehicle, and wherein said controller inhibits an operation of the vehicle-occupant protecting devices on a corresponding side of the vehicle, when said distance measured on the corresponding one of said rolling side and said non-rolling side of the vehicle is smaller than a predetermined threshold.

10. A control system for controlling a vehicle-occupant protecting device provided on an automotive vehicle, such that the control system operates the vehicle-occupant protecting device when the control system determines that a rollover motion of the vehicle has taken place, the control system comprising:

a controller that determines that said rollover motion of the vehicle has occurred, by determining at least one of first and second running states of the vehicle, when the first running state of the vehicle represented by a roll angle and a roll rate of the vehicle has fallen within a first predetermined rollover region (A) defined by threshold lines representing a first relationship between the roll angle and rate, or when the second running state of the vehicle represented by a lateral acceleration value and the roll rate of the vehicle has fallen within a second predetermined rollover region (B) defined by threshold lines representing a second relationship between the lateral acceleration value and the roll rate, and further represented by comparing a vector magnitude with a predetermined vector threshold, the vector magnitude being calculated from the lateral acceleration and the roll rate.

11. A control system according to claim 10, wherein the controller obtains a physical quantity representative of said lateral acceleration value of the vehicle when a point determined by said lateral acceleration value and said roll rate of the vehicle passes across one of said threshold lines representing said relationship between said lateral acceleration value and roll rate, and determines that said rollover action has taken place when said physical quantity is smaller than a predetermined value.

12. A control system according to claim 10, wherein the controller determines, after determining that said rollover motion of the vehicle has taken place, that a serious rollover action of the vehicle is expected to take place when said running state of the vehicle represented by said roll angle and rate of the vehicle has fallen within a rollover region (C) defined by threshold lines representing said roll angle and rate.

13. A method of controlling a vehicle-occupant protecting apparatus that includes at least two vehicle-occupant protecting devices which are disposed on respective right and left sides of an automotive vehicle comprising:

detecting a lateral acceleration value of the vehicle;

detecting a roll rate of the vehicle;

calculating a roll angle of the vehicle;

determining whether a running state of the vehicle represented by the roll angle and the roll rate of the vehicle has fallen within a predetermined rollover region (A) defined by threshold lines representing a relationship between the roll angle and the roll rate of the vehicle;

determining whether a running state of the vehicle represented by the lateral acceleration value and the roll rate of the vehicle has fallen within a predetermined rollover region (B) defined by threshold lines representing a relationship between the lateral acceleration value and the roll rate of the vehicle;

determining that a rollover motion of the vehicle has taken place, when said running state represented by said roll angle and rate has fallen within said predetermined rollover region (A) or when said running state represented by said lateral acceleration value and the roll rate has fallen within said predetermined rollover region (B);

operating only at least one of said vehicle-occupant protecting devices located on a rolling side of the vehicle, without initially operating any vehicle-occupant protecting device on a non-rolling side of the vehicle;

determining, after said at least one rolling-side vehicle-occupant protecting device is operated, whether a running state represented by said roll angle and rate of the vehicle has fallen within a predetermined rollover region (C) defined by threshold lines representing a relationship between the roll angle and rate;

determining that a serious-rollover motion of the vehicle is expected to take place, when said running state represented by said roll angle and rate has fallen within said predetermined rollover region (C); and operating at least one of the non-rolling-side vehicle-occupant protecting devices.

14. A method according to claim 13, wherein said threshold lines defining said predetermined rollover region (C) are shifted by 90° with respect to the threshold lines defining said predetermined rollover region (A) in a direction of said rollover motion of the vehicle.

15. A method according to claim 14, further comprising the steps of:

measuring a distance (L) between a head portion of an occupant of the vehicle and an inner side surface of a compartment within a body of the vehicle; and inhibiting an operation of a corresponding one of said rolling-side vehicle-occupant protecting device and said non-rolling-side vehicle-occupant protecting device, when said distance measured on a corresponding one of said rolling side and said non-rolling side of the vehicle is smaller than a predetermined threshold (LC).

16. A method according to claim 13, further comprising the steps of:

measuring a distance (L) between a head portion of an occupant of the vehicle and an inner side surface of a compartment within a body of the vehicle; and inhibiting an operation of a corresponding one of said rolling-side vehicle-occupant protecting device and said non-rolling-side vehicle-occupant protecting device, when said distance measured on a corresponding one of said rolling side and said non-rolling side of the vehicle is smaller than a predetermined threshold (LC).

* * * * *